(12) United States Patent
O'Regan et al.

(10) Patent No.: US 8,459,516 B2
(45) Date of Patent: Jun. 11, 2013

(54) STAKE HOLE ASSEMBLY FOR DEVICE ATTACHMENT

(76) Inventors: Joseph P. O'Regan, Westtown, NY (US); Jack P. Oriente, Westtown, NY (US)

( * ) Notice: Subject to any disclaimer, the term of this patent is extended or adjusted under 35 U.S.C. 154(b) by 200 days.

(21) Appl. No.: 13/068,759

(22) Filed: May 19, 2011

(65) Prior Publication Data

US 2012/0292360 A1 Nov. 22, 2012

(51) Int. Cl.
*B60R 9/00* (2006.01)
*B60R 11/00* (2006.01)

(52) U.S. Cl.
USPC ........... 224/403; 224/402; 224/544; 224/547; 224/555; 224/568

(58) Field of Classification Search
USPC ................. 224/402–405, 544, 547, 555–556, 224/567, 568; 410/101–102, 104–105, 106, 410/110; 296/37.6, 43
See application file for complete search history.

(56) References Cited

U.S. PATENT DOCUMENTS

| | | | |
|---|---|---|---|
| 5,141,277 A * | 8/1992 | Alexander | ........................ 296/43 |
| 5,326,203 A | 7/1994 | Cockrell | |
| 5,409,335 A * | 4/1995 | Beck | ............................. 410/105 |
| 6,290,441 B1 | 9/2001 | Rusu | |
| 6,374,466 B1 | 4/2002 | Macias | |
| 6,416,265 B1 * | 7/2002 | Flores et al. | .................. 410/106 |
| 6,464,437 B1 | 10/2002 | Elwell | |
| 6,468,009 B2 | 10/2002 | Elwell et al. | |
| 6,481,604 B1 | 11/2002 | Beene et al. | |
| 6,641,200 B2 | 11/2003 | Rusu | |
| 7,030,822 B1 | 4/2006 | Grabowski | |
| 7,234,619 B2 * | 6/2007 | Hicks et al. | ................... 224/547 |
| 7,481,610 B1 * | 1/2009 | Egigian | ........................ 410/106 |
| 7,594,478 B2 | 9/2009 | Karnes et al. | |

* cited by examiner

*Primary Examiner* — Nathan Newhouse
*Assistant Examiner* — Adam Waggenspack
(74) *Attorney, Agent, or Firm* — Larry J. Prescott

(57) ABSTRACT

An attachment mechanism is described for attaching accessories to a stake hole in the sidewall of a cargo area of a vehicle, such as a pickup truck. The mechanism comprises of a base plate with a grove formed in the top of the base plate having the shape of an inverted T. An attachment plate having a connector, also having the shape of an inverted T, is attached to the bottom surface of the attachment plate. An attachment such as a tie down ring, a tie down anchor, a flag pole or tent pole holder or the like is attached to the top surface of the attachment plate. The attachment plate can then be attached to the base plate by sliding the inverted T shaped connector into the inverted T shaped groove in the base plate. Another attachment mechanism is described which can be used to attach accessories to vehicles without stake holes or to other regions of a vehicle.

15 Claims, 10 Drawing Sheets

US 8,459,516 B2

STAKE HOLE ASSEMBLY FOR DEVICE ATTACHMENT

BACKGROUND OF THE INVENTION (1) Field of the Invention

This invention relates to assemblies which are attached to stake holes in a pickup truck or the like. These assemblies permit rapid attachment and detachment of a number of accessories for the stake holes. The invention also relates to attachment of accessories to vehicles or parts of vehicles where stake holes are not available.

(2) Description of Related Art

Pickup trucks usually include stake holders in the sidewalls of the truck bed. A number of workers have devised attachments which can be mounted to these stake holes to hold accessories for both decorative and utilitarian purposes.

U.S. Pat. No. 7,594,478 to Karnes et al. describes a truck bed stake hole assembly using a shaft with a threaded end and a bottom plate shaped like a rectangle with one rounded end to attach the shaft to the stake hole of a truck bed.

U.S. Pat. No. 7,030,822 to Grabowski describes an antenna mounting bracket for mounting antennas to the bed of a pickup truck.

U.S. Pat. No. 6,641,200 to Rusu describes a tonneau cover attachment system using a stake pocket in a sidewall of a vehicle.

U.S. Pat. No. 6,481,604 to Beene et al. describes a vehicle rack using retaining arms in stake pockets of a pickup truck bed.

U.S. Pat. No. 6,468,009 to Elwell et al. describes a pop-up tie down device which includes a body member having an attachment member for securing the body member to a stake hole of a side wall of a vehicle carrier.

U.S. Pat. No. 6,464,437 to Elwell describes a tie down mechanism using an elongated tie down post and a hollow stake post having a hollow shaft adapted to fit in the stake pocket of a pickup truck.

U.S. Pat. No. 6,416,265 to Flores et al. describes a vehicle tie-down strap anchor and storage assembly to fit a vehicle stake pocket.

U.S. Pat. No. 6,290,441 to Rusu describes a stake pocket tie down apparatus.

U.S. Pat. No. 6,374,466 to Macias describes a spring loaded and latchable stake pocket tie down apparatus.

U.S. Pat. No. 5,326,203 to Cockrell describes an anchor assembly adapted to fill the upper areas of a stake pocket hole found in a pickup truck.

U.S. Pat. No. 5,141,277 to Alexander describes a stake pocket insert assembly that can engage the interior of a stake pocket and provide a tie down anchor.

SUMMARY OF THE INVENTION

Vehicles having cargo areas with sidewalls, such as pickup trucks, typically have stake pockets formed in these sidewalls for attaching or mounting accessories for utilitarian purposes such as sidewall extensions or tie down hardware or for decorative purposes such as displaying flags. A number of devices have been described which permit such attachment of these accessories to sidewalls, however these attachment devices are of a relatively permanent nature and can be difficult or time consuming to attach or to remove. There are also vehicles or regions of vehicles where stake holes are not available where it is desired to attach or mount accessories for these utilitarian or decorative purposes.

It is a principal objective of this invention to provide an attachment mechanism which makes the attachment of many different accessories to these stake pockets and their removal quick and easy.

It is another principal objective of this invention to provide an attachment mechanism which makes the attachment of many different accessories to a cargo area wall or other region of a vehicle without stake pockets and their removal quick and easy.

These objectives are achieved by attaching a base plate to a cargo area wall using one or more of the stake pockets and a U-shaped clamp for each base plate used. The base plate has a groove, having the shape of an inverted T, formed in the top surface of the base plate. One or more attachment plates are formed having a connector, having the shape of a matching inverted T, attached to the bottom surface of the attachment plate. A number of attachments such as tie down rings, flag pole holders, T shaped tie down anchors, tent poles, or the like can be attached to the top surface of one of these attachment plates. These attachments, attached to an attachment plate, can then be easily connected to a base plate, which has been attached to a stake pocket, by sliding the connector of the attachment plate into the groove of the base plate or easily removed by sliding the connector of the attachment plate out of the groove of the base plate.

Ball plungers can be added to the base plate so that the rounded tip of the ball plungers extends slightly above the top surface of the base plate. Indentations in the attachment plate are then located to correspond to the tips of the ball plungers so that the ball plungers hold the attachment plate in place but permit easy removal of the attachment plate when desired. The groove in the base plate is closed at one end thereby creating a positive stop. The base plate is oriented so that the closed end of the groove in the base plate is oriented toward the cargo area defined by the sidewall having the stake pocket.

These objectives can also be achieved for vehicles or regions of vehicles without stake pockets by using one or more of the U-shaped clamps in an inverted position attached directly to a base to which an accessory holder has been attached. The base and the U-shaped clamp are placed on opposite sides of a flat surface of the vehicle or attached to the vehicle and held in place using screws.

DESCRIPTION OF THE PREFERRED EMBODIMENTS

Figure 1:
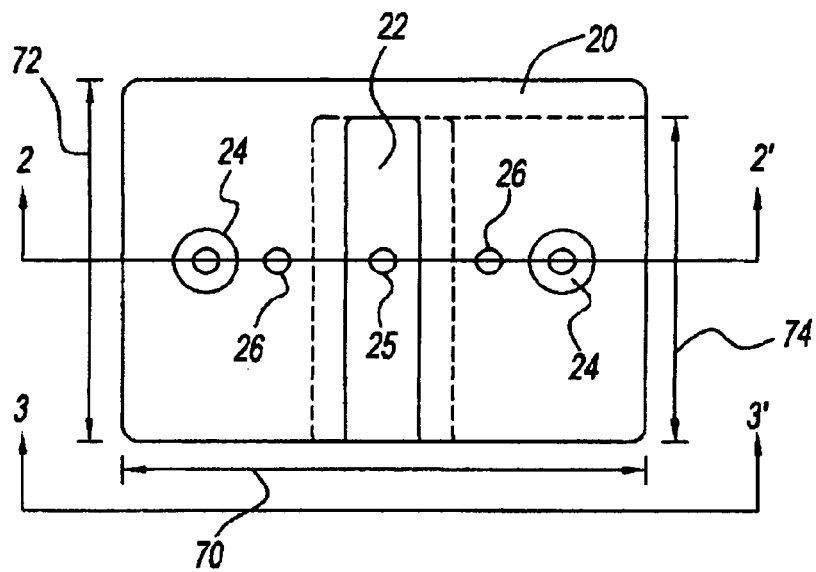
FIG. 1 shows the top view of a base plate.

Refer now to FIGS. 1-22 for a description of preferred embodiments of this invention. FIG. 1 shows a top view of a base plate 20 which is a major part of the attachment mechanism of this invention having a length 70 and a width 72. The length 70 in this example is about 2.5 inches and the width 72 is about 1.75 inches. The thickness 75 of the base plate is about 0.5 inches. The dimensions described herein are for purposes of an example and may be changed, depending on the application of the invention. Two countersunk holes 24 are formed in the base plate 20 and are used to attach the base plate to a stake pocket. Two ball plungers 26 are attached to the base plate 20 and protruding through the top surface of the base plate 20 which will hold devices attached to the base plate in place as will be further described later. A groove 22, having a length of a first distance 74 is formed in the base plate. A drainage hole 25 is formed through the base plate at the bottom of the groove 22 to drain water from the base plate 22 if necessary. In this example the first distance 74 is about 1.625 inches.

Figure 2:
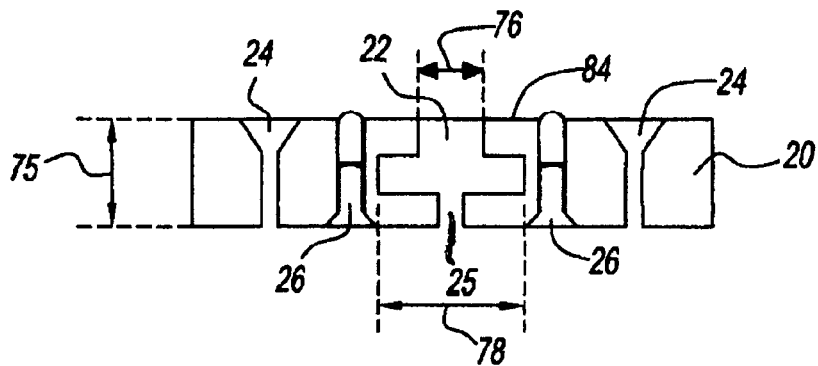
FIG. 2 shows a cross section view of the base plate of FIG. 1 taken along line 2-2' of FIG. 1.
Figure 3:
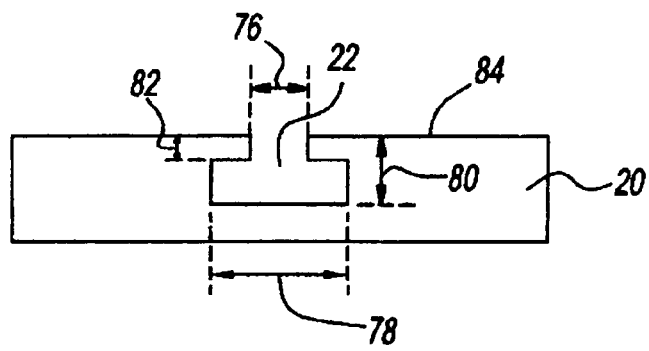
FIG. 3 shows a front view of the base plate of FIG. 1 taken along line 3-3' of FIG. 1.

FIG. 2 shows a cross section view of the base plate 20 taken along line 2-2' in FIG. 1. FIG. 2 shows the drainage hole 25 at the bottom of the groove 22. FIG. 3 shows a front view of the base plate 20 taken along the line 3-3' in FIG. 1. As seen in FIG. 3 the groove 22 has a width 76 of a second distance between the top surface 84 of the base plate and a third distance 82 below the top surface 84 of the base plate 20 and a width of a fourth distance 78 between the third distance 82 below the top surface 84 of the base plate 20 and a fifth distance 80 below the top surface 84 of the base plate 20. The fifth distance 80 is greater than the third distance 82 and the fourth distance is greater than the second distance so that the groove has the shape of an inverted T. In this example the second distance is about 0.25 inches, the third distance is about 0.25 inches, the second distance is about 0.125 inches, the fourth distance is about 0.625 inches, and the fifth distance is about 0.3125 inches. These dimensions can vary slightly to insure the parts fit together and separate easily.

FIG. 2 also shows the two countersunk through holes 24 and the two spring loaded ball plungers 26. Ball plungers 26 can be added to the base plate 20 so that the rounded tip of the ball plungers 26 extends slightly above the top surface 84 of the base plate 20. Indentations in an attachment plate, which will be described later, are then located to correspond to the tips of the ball plungers 26 so that the ball plungers 26 hold the attachment plate in place but permit easy removal of the attachment plate when desired. Typically the base plate 20 is constructed of metal and can be formed as described above using a machining process. The base plate can also be formed using a metal casting process. The base plate could also be molded plastic.

Figure 4:
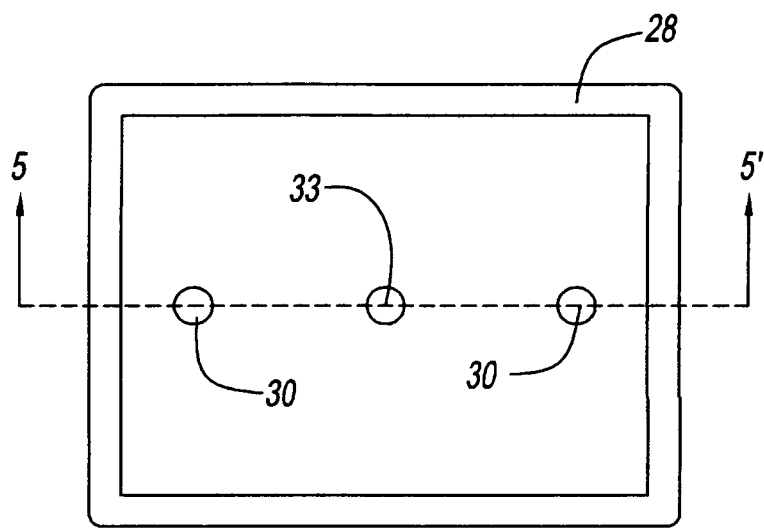
FIG. 4 shows a top view of a plastic insert used between the base plate and a stake pocket.
Figure 5:
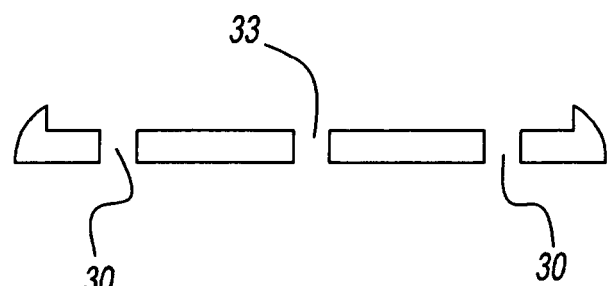
FIG. 5 shows a cross section view of the plastic insert of FIG. 4 taken along line 5-5' of FIG. 4.

FIG. 4 shows the top view and FIG. 5 a cross section view, taken along line 5-5' of FIG. 4, of an insert 28 which can be placed between the base plate 20 and a stake pocket to protect the vehicle from scratches. The insert has two holes 30 which are located to coincide with the two countersunk through holes 24 formed in the base plate 20 and a drainage hole 33 for water drainage located to correspond to the drainage hole 25 in the base plate, see FIG. 8.

Figure 6:
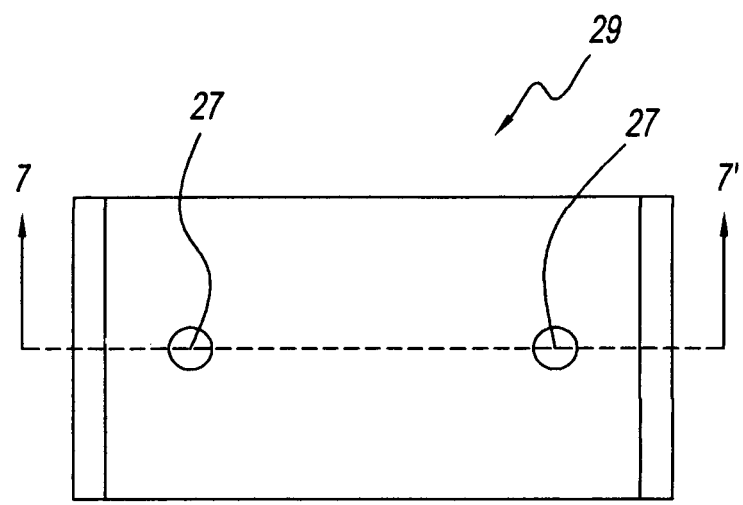
FIG. 6 shows a top view of a U bracket used to attach the base plate to a stake pocket or, when inverted, to a flat surface of a vehicle.
Figure 7:
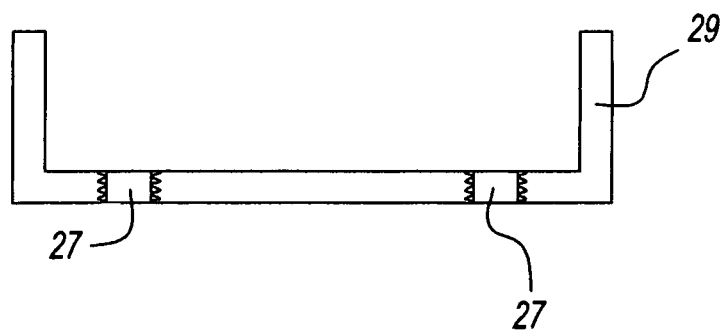
FIG. 7 shows a cross section view of the U bracket of FIG. 6 taken along line 7-7' of FIG. 6.
Figure 8:
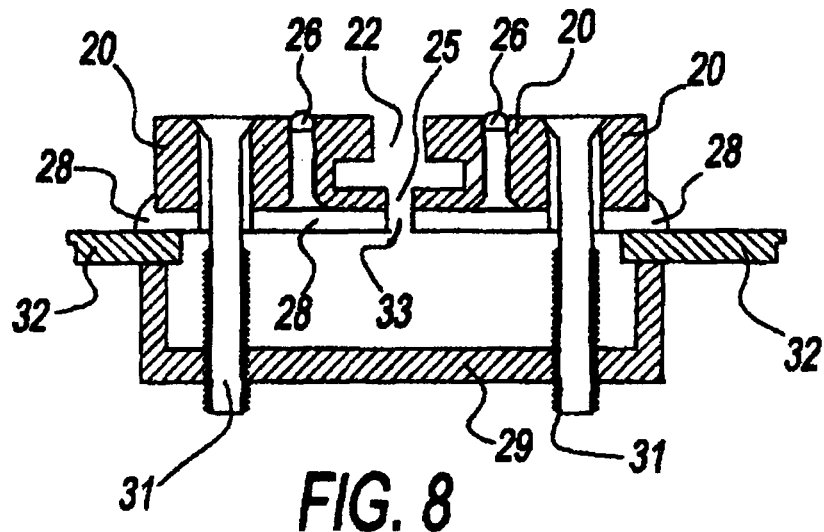
FIG. 8 shows a cross section view of the base plate attached to the stake pocket taken along line 8-8' of FIG. 9.
Figure 9:
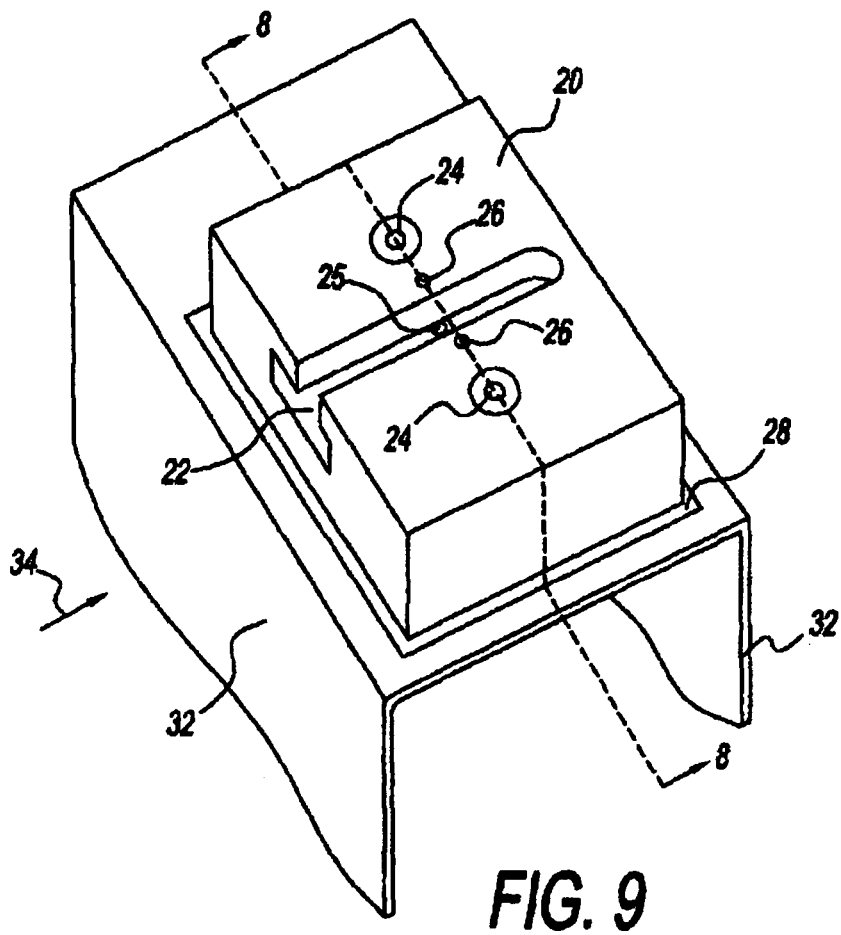
FIG. 9 shows a perspective view of the base plate attached to a stake pocket of a vehicle.

FIG. 6 shows the top view and FIG. 7 a cross section view, taken along line 7-7' of FIG. 6, of a U shaped bracket 29 used to attach the base plate to a stake pocket or, when inverted, to a flat surface of a vehicle. The bracket 29 has two threaded holes 27 and are spaced to correspond to the two countersunk holes 24 in the base plate 20 and, if the insert 28 is used, the two holes 30 in the insert 28. FIG. 8 shows a cross section view of the U shaped bracket being used to attach the base plate 20 and the insert 28 to a stake pocket in the sidewall 32 of a cargo area of a vehicle, such as a pickup truck, using two screws 31. Only a small segment of the cargo wall 32 which contains the stake pocket is shown in FIG. 8. The attached base plate 20 is shown in the perspective view shown in FIG. 9. FIG. 8 is a cross section view of the assembly shown in FIG. 9 taken along line 8-8' of FIG. 9 and shows the base plate 20 and insert 28 attached to a stake pocket in the cargo area wall 32. The view indicated by the arrow 34 is from outside the cargo area showing that the open end of the groove 22 in the base plate 20 is opposite to the cargo area of the vehicle. FIGS. 8 and 9 show the drainage hole 25 in the base plate 20. FIG. 8 also shows the drainage hole 33 in the insert 28.

Figure 10:
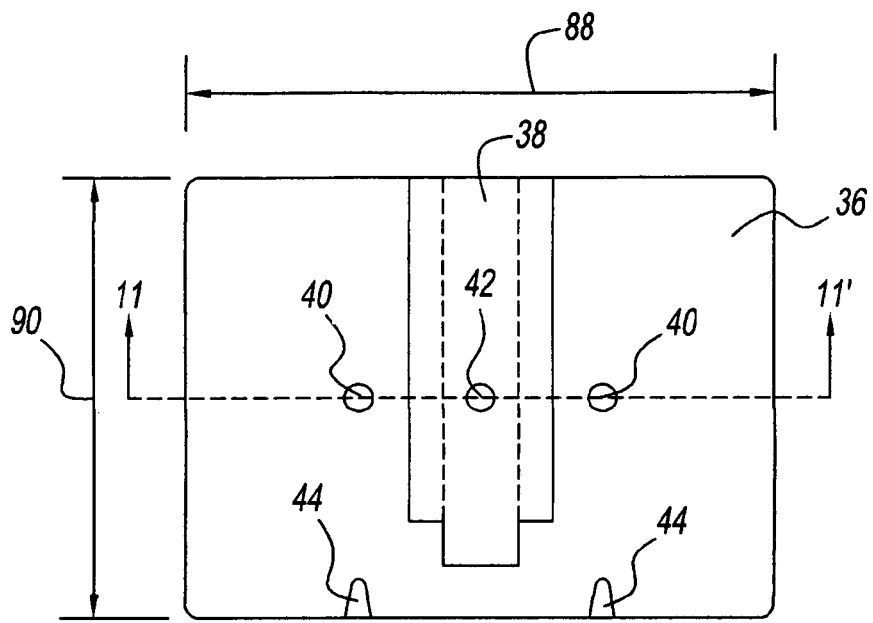
FIG. 10 shows a bottom view of an attachment plate.
Figure 11:
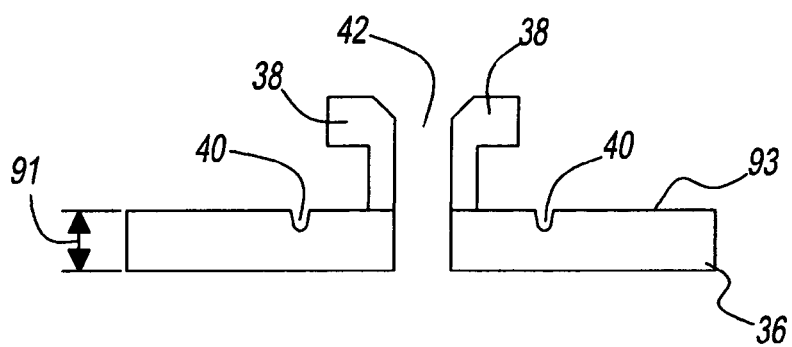
FIG. 11 shows a cross section of the bottom side up attachment plate of FIG. 10 taken along line 11-11' of FIG. 10.

FIGS. 10 and 11 show a bottom view and a cross section view of an attachment plate 36 which is used to join attachments to the base plate and thus to a stake pocket. FIG. 10 shows a bottom view of an attachment plate 36 and FIG. 11 shows a cross section view taken along line 11-11' of FIG. 10. The attachment plate 36 has a length 88 and a width 90. Typically, but not necessarily, the length 88 and the width 90 of the attachment plate 36 will be the same as the length 70 and width 72 of the base plate. In this example the length 88 of the attachment plate is about 2.54 inches, the width 90 of the attachment plate is about 1.75 inches, and the thickness 91 of the attachment plate is about 0.1875 inches.

Figure 12:
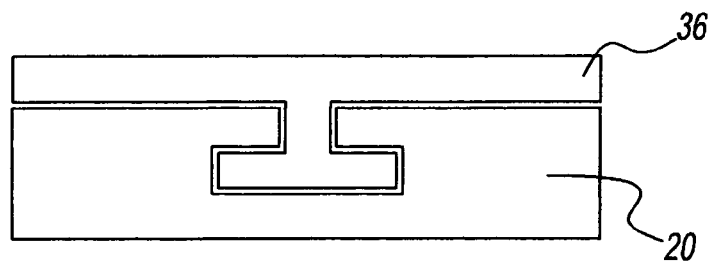
FIG. 12 shows a front view of an attachment plate or base plate cover joined to a base plate.

As can be seen in FIGS. 10 and 11 a connector 38 is attached to the bottom surface 93, see FIG. 11, of the attachment plate. The connector and the attachment plate can be formed as one piece. The connector 38 has the shape of an inverted T when the attachment plate is viewed in the normal orientation, see FIG. 12 as an example. FIGS. 10 and 11 show the attachment plate in an inverted position. The attachment plate has two indentations 40 in the bottom surface of the attachment plate 36 which are located to coincide with the ball plungers 26 in the base plate. The attachment plate can also have a hole 42 for water drainage if desired, as shown in FIGS. 10 and 11, but the hole can be omitted if desired. FIG. 12 shows the front view of the attachment plate 36 joined to the base plate 20 when viewed from the outside of the cargo area of the vehicle in the direction indicated by the arrow 34 of FIG. 9. As shown in FIG. 12 the connector attached to the bottom surface of the attachment plate has dimensions corresponding to the dimensions of the groove in the base plate and the length of the connector is the same as the length of the groove, thereby forming a positive stop.

FIG. 12 shows a slight gap between the groove in the base plate and the connector attached to the attachment plate, and between the base plate and the attachment plate. In actual use the mating surfaces of the attachment plate are in contact with the corresponding surfaces of the base plate, however the dimensions of the connector 38 attached to the attachment plate 36 and the groove 22 in the base plate 20 may need to be modified slightly to allow the connector 38 to slide easily into and out of the groove 22. The attachment plate is easily connected to the base plate by sliding the connector of the attachment plate into the groove of the base plate. The spring loaded ball plungers, as well as the orientation of the base plate relative to separation forces of any cargo keep the attachment plate in place. When desired the connector can easily be removed from the groove in the base plate using a small force. The removal force is usually about 6 pounds.

The attachment plate 36 can also be a flat plate attached to a connector 38 with no holes to serve as a protective cover for a base plate 20. In this case the front view of the attachment plate 36 attached to the base plate 20 is shown in FIG. 12.

FIG. 10 also shows two grooves 44 at the edge of the bottom surface of the attachment plate 36 which will be the first edge to contact the spring loaded ball plungers 26 in the base plate 20. These grooves ease the depression of the ball plungers as the attachment slides over them to the position where the location of the ball plungers corresponds to the two indentations 40 in the bottom surface of the attachment plate 36.

Figure 13:
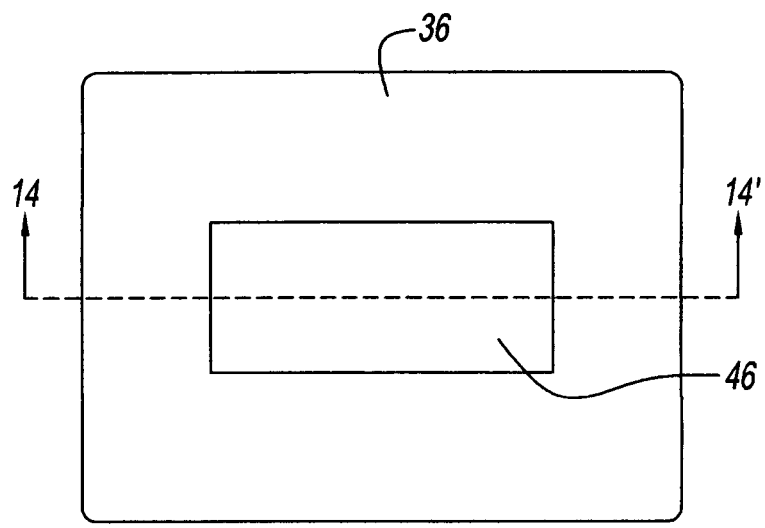
FIG. 13 shows a top view of an attachment plate with a ring attached.
Figure 14:
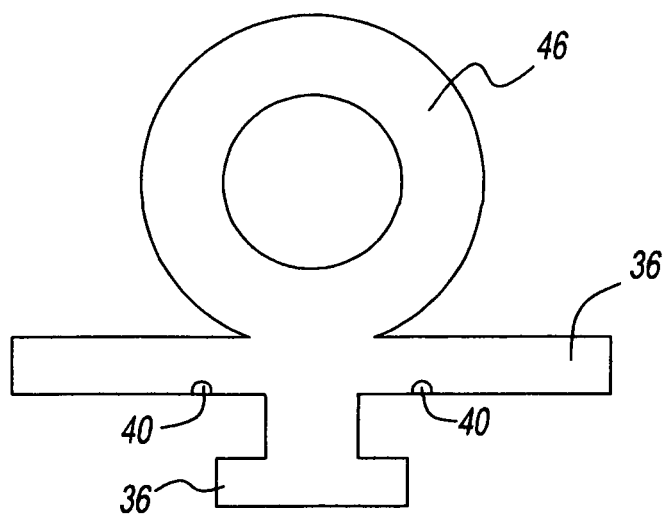
FIG. 14 shows a cross section view of the attachment plate with a ring attached of FIG. 13 taken along line 14-14' of FIG. 13.

FIGS. 13 and 14 show a ring 46 attached to the attachment plate 36. FIG. 13 shows a top view and FIG. 14 shows a cross section view taken along line 14-14' of FIG. 13. The ring and the attachment plate 46 can be joined using a number of means such as solder, brazing, welding, or adhesive and can be fabricated of metal, plastic or the like. The ring 46 and attachment plate 36 can also be formed as a single piece using means such as casting or molding.

Figure 15:
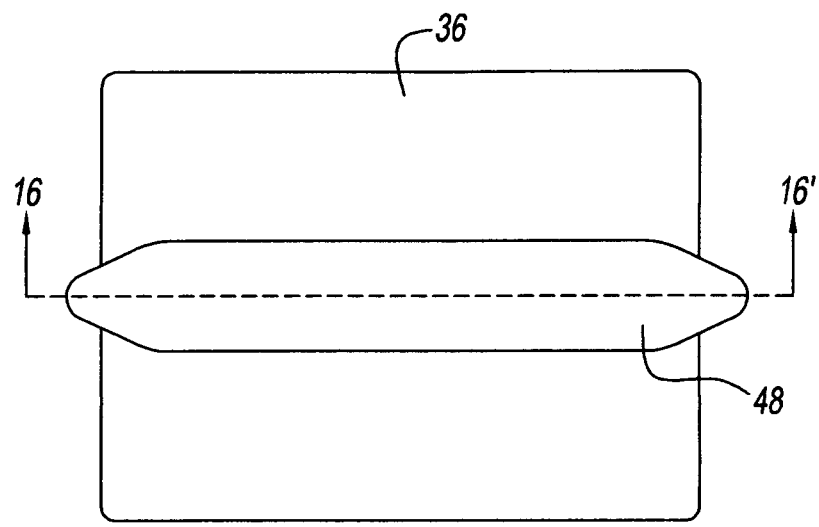
FIG. 15 shows a top view of an attachment plate with a tie down attached.
Figure 16:
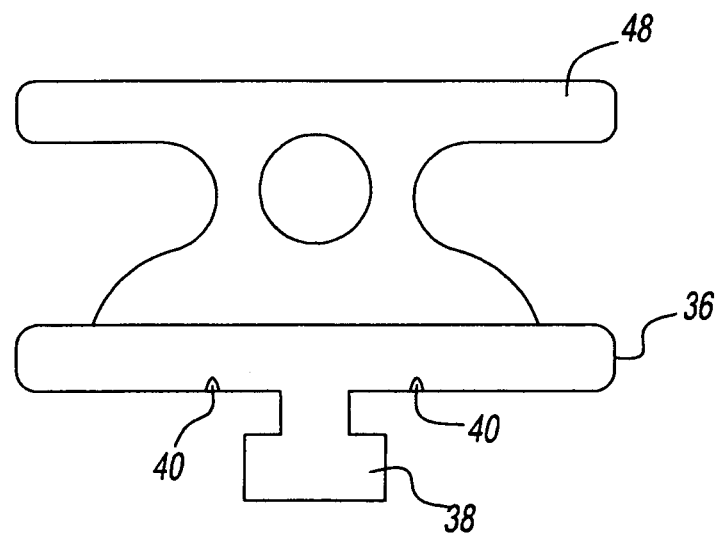
FIG. 16 shows a cross section view of the attachment plate with a tie down attached of FIG. 15 taken along line 16-16' of FIG. 15.

FIGS. 15 and 16 show a tie down anchor 48 attached to the attachment plate 36. FIG. 15 shows a top view and FIG. 16 shows a cross section view taken along line 16-16' of FIG. 15. The tie down anchor 48 and the attachment plate 36 can also be joined using a number of means such as solder, brazing, welding, or adhesive. The tie down anchor 48 and the attachment plate 36 can be fabricated of metal, plastic or the like and can also be formed as a single piece using means such as casting or molding.

Figure 17:
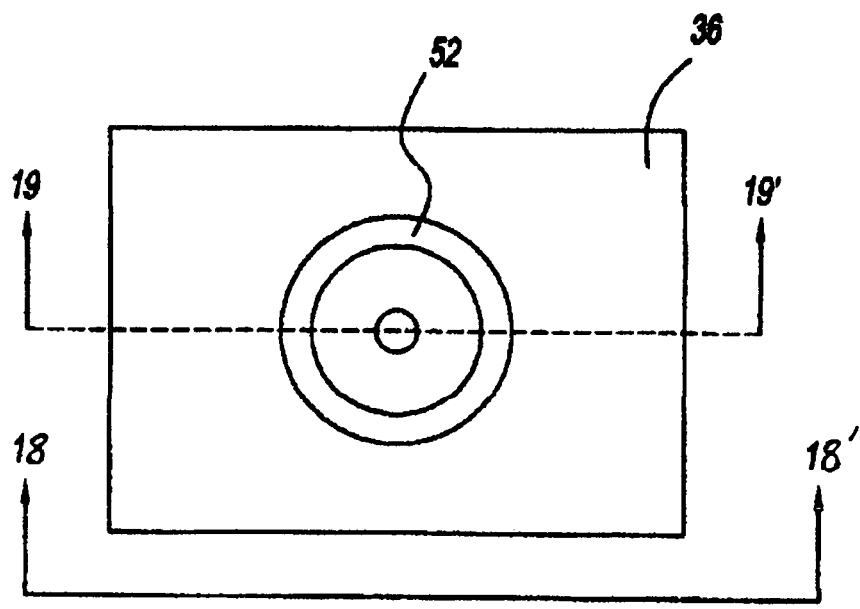
FIG. 17 shows a top view of an attachment plate with a flag pole holder attached.
Figure 18:
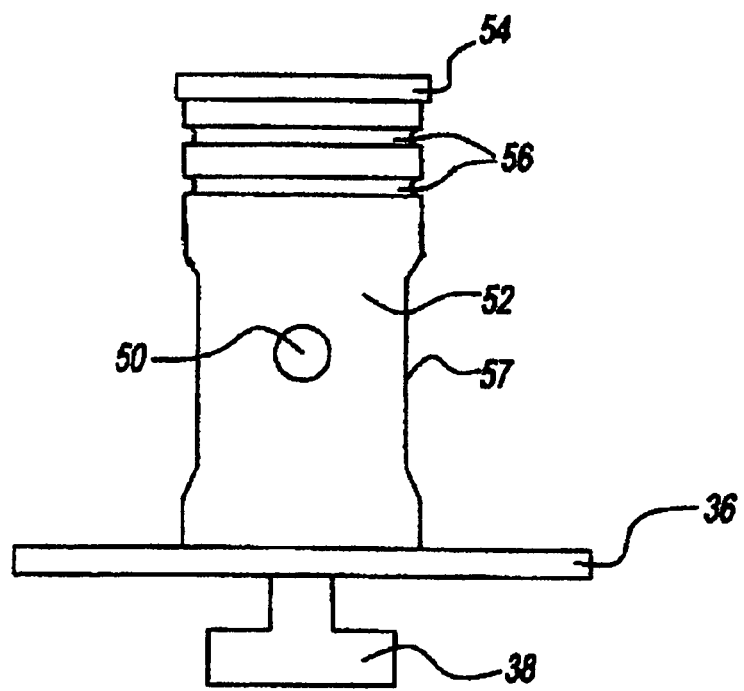
FIG. 18 shows a front view of the attachment plate with a flag holder attached of FIG. 17 taken along line 18-18' of FIG. 17.
Figure 19:
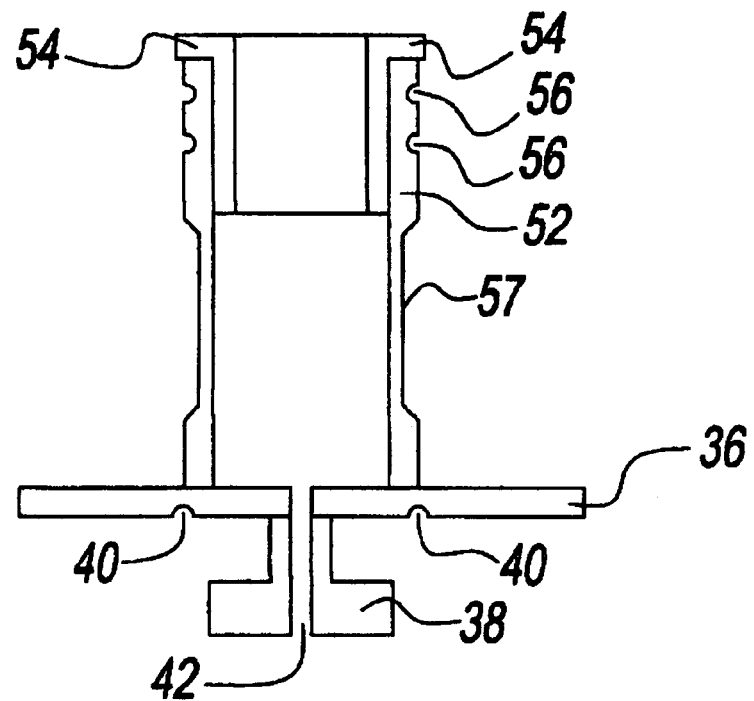
FIG. 19 shows a cross section view of the attachment plate with a flag holder attached of FIG. 17 taken along line 19-19' of FIG. 17.

FIG. 17 shows a top view and FIG. 18 shows a front view, taken along line 18-18' of FIG. 17, of a flag pole holder 52 attached to an attachment plate 36. The flag pole holder 52 can have decorative grooves 56 and 57 formed in the flag pole holder. The flag pole holder can also have a hole 50 in the sidewall of the flag pole holder 52 to accommodate a ball plunger type retaining mechanism in the flag pole to help hold the flag pole in place. FIGS. 18 and 19 show a bushing 54, typically but not necessarily formed of nylon, in the top of the flag holder 52. FIG. 19 shows a cross section view of the flag pole holder taken along line 19-19' of FIG. 17. FIG. 19 shows the bushing inserted into the top of the flag pole holder.

Figure 20:
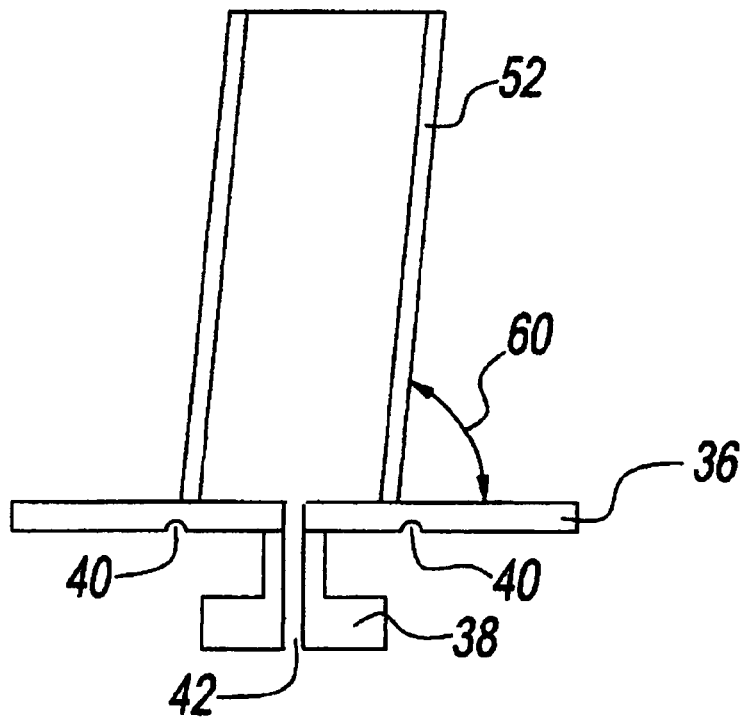
FIG. 20 shows a cross section view of an attachment plate with a flag holder attached showing the flag holder having an angle other than perpendicular to the attachment plate.

The flag pole holders of FIGS. 17, 18, and 19 show a flag pole holder which holds a flag perpendicular to the attachment plate 36. FIG. 20 shows a cross section view of a flag holder 52 attached to an attachment plate 36 which holds a flag at an angle 60 which is different from 90°, such as 45° or 60°. FIGS. 17, 19, and 20 also show a water drainage hole 42 in the flag pole holder.

The flag pole holders, as well as the other attachments to the attachment plate described herein can be metal or plastic and could be fabricated using machining, casting, molding, brazing, soldering, adhesives or the like.

Figure 21:
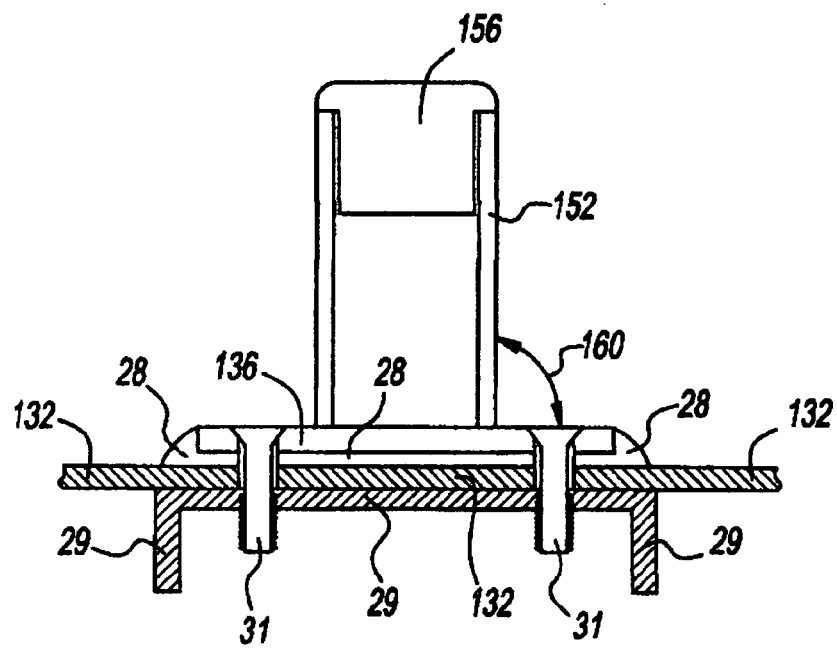
FIG. 21 shows a cross section view of a flag holder attached to an area other than a stake pocket using a permanent mount.

Refer now to FIG. 21 for another preferred embodiment of this invention for cases where it is preferred to mount accessories where stake pockets are not available or convenient or where it is desirable to mount accessories to other areas such as a light bar, tool box with flat top surfaces, or the like. Any flat surface area where the underside is accessible can be used. FIG. 21 shows a flag holder attached to a segment 132 of such a flat surface. In place of the base plate 36 described previously the attachment, in this example a flag pole holder 152, is joined to a flat base 136. Usually, but not necessarily, the base 136 has about the same dimensions as the base plate 36, but does not have the T shaped connector 38 shown in FIG. 20. In this example the base 136 has a length of about 2.5 inches, a width of about 1.75 inches, and a thickness of about 0.1875 inches The attachment, in this case a flag pole holder 152, is joined to the base 136. The base 136 and attachment 152, which can be a flag pole holder or other attachment as previously described herein can be metal or plastic and could be fabricated using machining, casting, molding, brazing, soldering, adhesives or the like. The angle 160 between the flag pole holder 152 and the base is shown as 90° but can be any angle, such as 45° or 60°, as desired such as the angle shown in FIG. 20 by reference number 60. The previously described insert 28 can be placed between the base 136 and the flat surface 132 or other region of the vehicle to which the base 136 is attached to prevent scratching or other damage to the flat surface 132.

FIG. 21 also shows a cap or plug 156 inserted into the top of the flag pole holder to prevent water or foreign objects from entering the flag pole holder when no flag is present. The cap or plug 156 is usually plastic but can be any suitable material.

The insert 28 has two holes which are located to coincide with two countersunk through holes formed in the base 136 as well as openings in the region of the flat surface 132 to which the base 136 is to be attached. The base 136 is secured using two screws 31 extending from the base 136 to the two threaded holes in the U shaped bracket 29, in this case mounted with the opening of the U pointed down, thereby securing the base 136 and the attachment, in this example a flag pole holder 152, to the desired region of the flat surface 132. A water drainage hole is not shown in FIG. 21, however one can be added if desired.

This example has described the attachment of a flag pole holder, however it will be readily apparent to those skilled in the art that other attachments could be secured to the flat surface 132 in a similar manner.

Figure 22:
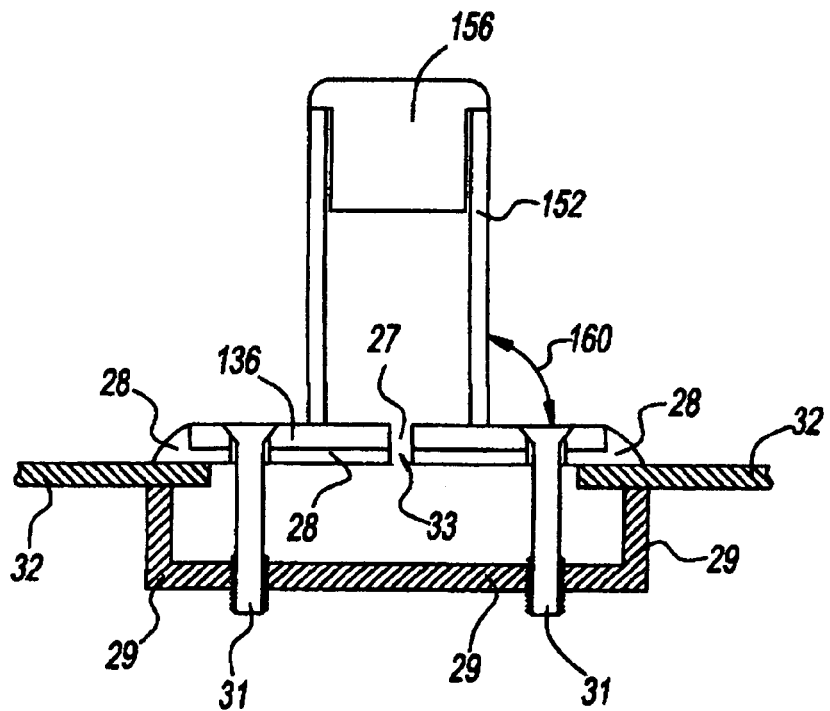
FIG. 22 shows a cross section view of a flag holder attached to a stake pocket using a permanent mount.

Refer now to FIG. 22 for another preferred embodiment of this invention for cases where it is preferred to mount accessories to stake pockets of a vehicle in a more permanent manner. As in the previous example, in place of the base plate 36 described previously the attachment, in this example a flag pole holder 152, is joined to a flat base 136. Usually, but not necessarily, the base 136 has about the same dimensions as the base plate 36, but does not have the T shaped connector 38 shown in FIG. 20. In this example the base 136 has a length of about 2.5 inches, a width of about 1.75 inches, and a thickness of about 0.1875 inches The attachment, in this case a flag pole holder 152, is joined to the base 136. The base 136 and attachment 152, which can be a flag pole holder or other attachment as previously described herein can be metal or plastic and could be fabricated using machining, casting, molding, brazing, soldering, adhesives or the like. The angle 160 between the flag pole holder 152 and the base is shown as 90° but can be any angle, such as 45° or 60°, as desired, such as the angle shown in FIG. 20 by reference number 60. The previously described insert 28 can be placed between the base 136 and the stake pocket to prevent scratching or other damage to the sidewall 32 of the cargo area of a vehicle. FIG. 22 also shows a cap or plug 156 inserted into the top of the flag pole holder to prevent water or foreign objects from entering the flag pole holder when no flag is present. The cap or plug 156 is usually plastic but can be any suitable material and could be formed by molding, casting, machining, or other suitable methods.

The insert 28 has two holes which are located to coincide with two countersunk through holes formed in the base 136. The base 136 is secured using two screws 31 extending from the base 136 to the two threaded holes in the U shaped bracket 29 located in the stake pocket, in this case mounted with the opening of the U pointed up, thereby securing the base 136 and the attachment, in this example a flag pole holder 152, to the stake hole. A drainage hole 27 in the base 136 and a corresponding drainage hole 33 in the insert 28 are shown in FIG. 22.

This example has described the attachment of a flag pole holder, however it will be readily apparent to those skilled in the art that other attachments could be secured to a stake hole in a similar manner.

While the invention has been particularly shown and described with reference to the preferred embodiments thereof, it will be understood by those skilled in the art that various changes in form and details may be made without departing from the spirit and scope of the invention.

The invention claimed is:

1. A mechanism to attach accessories to a stake pocket in a cargo area sidewall of a vehicle, comprising:
   a rectangular base plate having a first length, a width, a first edge, a second edge parallel to said first edge, a third edge perpendicular to said first edge, a fourth edge parallel to said third edge, a thickness, a top surface, and a bottom surface, wherein said width is the distance between said first edge and said second edge;
   a groove formed in said base plate perpendicular to said first edge and extending from said first edge of said base plate to a first distance from said first edge of said base plate, wherein said first distance is less than said width of said base plate, wherein said groove has a width of a second distance between said top surface of said base plate and a third distance below said top surface of said base plate, and a width of a fourth distance between said third distance below said top surface of said base plate and a fifth distance below said top surface of said base plate, wherein said fifth distance is less than said thickness of said base plate and is greater than said third distance, and said fourth distance is greater than said second distance so that said groove has the shape of an inverted T;
   spring loaded ball plungers having rounded ends attached to said base plate so that said rounded ends of said ball plungers extend through said top surface of said base plate;
   means to attach said base plate to said stake pocket;
   a rectangular attachment plate having a first edge, a length, a width, a top surface, a bottom surface, and a thickness;
   a connector, having the shape of an inverted T, attached to said bottom surface of said attachment plate wherein said inverted T shaped connector has a width of said second distance between said bottom surface of said attachment plate and said third distance below said bottom surface of said attachment plate, said inverted T shaped connector has a width of said fourth distance between said third distance below said attachment plate and said fifth distance below said bottom surface of said attachment plate, and said inverted T shaped connector extends said first distance from and perpendicular to said first edge and wherein the dimensions of said inverted T shaped connector and said groove in said base plate are sized to have sufficient clearance to allow said inverted T shaped connector to slide into said groove in said base plate thereby permitting said attachment plate to be joined to or separated from said base plate;
   indentations formed in said attachment plate and located to allow said ball plungers to protrude into said indentations after said attachment plate has been joined to said base plate thereby holding said attachment plate in place until it is desired to separate said attachment plate from said base plate; and
   means to attach an accessory to said attachment plate.

2. The attachment mechanism of claim 1 wherein said means to attach said base plate to said stake pocket comprises countersunk holes formed in said base plate, a U shaped bracket placed inside said stake pocket wherein said U shaped bracket has threaded holes located to coincide with said countersunk holes in said base plate, and threaded screws passing through said countersunk holes in said base plate and connected to said threaded holes in said U shaped bracket.

3. The attachment mechanism of claim 1 wherein said rectangular base plate is metal or plastic.

4. The attachment mechanism of claim 1 wherein said attachment plate is metal or plastic.

5. The attachment mechanism of claim 1 wherein said rectangular base plate is formed by machining, casting, or molding.

6. The attachment mechanism of claim 1 wherein said attachment plate is formed by machining, casting, or molding.

7. The attachment mechanism of claim 1 wherein said means to attach said accessory to said attachment plate comprises welding, brazing, or adhesive.

8. The attachment mechanism of claim 1 wherein said attachment plate and said accessory are formed as a single piece.

9. The attachment mechanism of claim 1 wherein said length of said base plate is about 2.5 inches, said width of said base plate is about 1.75 inches, and said thickness of said base plate is about 0.5 inches.

10. The attachment mechanism of claim 1 wherein said length of said attachment plate is about 2.5 inches, said width of said attachment plate is about 1.75 inches, and said thickness of said attachment plate is about 0.1857 inches.

11. The attachment mechanism of claim 1 wherein said first distance is about 1.625 inches, said second distance is about 0.25 inches, said third distance is about 0.25 inches, said second distance is about 0.125 inches, said fourth distance is about 0.625 inches, and said fifth distance is about 0.3125 inches, and wherein said inverted T shaped groove in said base plate and said inverted T shaped connector attached to said bottom surface of said attachment plate are sized so that said inverted T shaped connector slides into said groove in said base plate thereby attaching said attachment plate to said base plate.

12. The attachment mechanism of claim 1 further comprising tapered grooves at said first edge of said attachment plate to ease the attachment of said attachment plate to said base plate.

13. The attachment mechanism of claim 1 further comprising a plastic insert between said base plate and said stake pocket.

14. The attachment mechanism of claim 1 wherein said accessory is a flag pole holder wherein said flag pole holder can hold a flag pole at any desired angle.

15. The attachment mechanism of claim 1 wherein said accessory is a tie down bracket.

* * * * *